(12) United States Patent
Numajiri (10) Patent No.: US 8,186,966 B2
(45) Date of Patent: May 29, 2012

(54) OFFSHORE WIND TURBINE GENERATOR (75) Inventor: Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/835,892

(22) Filed: Jul. 14, 2010

(65) Prior Publication Data
US 2011/0142680 A1      Jun. 16, 2011

(30) Foreign Application Priority Data

May 6, 2010   (WO) ................ PCT/JP2010/057754

(51) Int. Cl.
F03D 11/04       (2006.01)
(52) U.S. Cl. ............... 416/244 R; 52/40; 52/169.13
(58) Field of Classification Search ............ 416/DIG. 6, 416/244 R; 52/40, 169, 296
See application file for complete search history.

(56) References Cited

U.S. PATENT DOCUMENTS

| | | | | |
|---|---|---|---|---|
| 4,323,331 | A * | 4/1982 | Schachle et al. ............ | 416/9 |
| 7,347,667 | B2 * | 3/2008 | Wobben .................... | 416/1 |
| 2007/0294955 | A1 * | 12/2007 | Sportel .................... | 52/40 |
| 2009/0031639 | A1 * | 2/2009 | Cortina Cordero ........ | 52/40 |
| 2011/0058944 | A1 * | 3/2011 | Zuteck .................... | 416/1 |

FOREIGN PATENT DOCUMENTS

| | | |
|---|---|---|
| JP | 62-160058 U | 10/1987 |
| JP | 2006-524778 A | 11/2006 |
| JP | 2009-85167 A | 4/2009 |
| JP | 4444849 B2 | 1/2010 |
| WO | 2004/097217 A1 | 11/2004 |

OTHER PUBLICATIONS

International Search Report of Application No. PCT/JP2010/057754 mailed Aug. 10, 2010.

* cited by examiner

*Primary Examiner* — Edward Look
*Assistant Examiner* — Dwayne J White
(74) *Attorney, Agent, or Firm* — Kanesaka Berner & Partners, LLP (57) ABSTRACT

Provided is an offshore wind turbine generator capable of withstanding unevenly distributed stress with a simple and inexpensive structure and of maintaining reliability in terms of strength. An offshore wind turbine generator includes a nacelle that rotatably supports a rotor head, and a tower portion that supports the nacelle and yaws integrally with the nacelle, and a structure portion that bears the strength of the tower portion has a higher strength against a load in a direction included in a plane having a rotation axis of the rotor head and an extending direction of the tower portion than the strength of the structure portion against a load in a direction included in other planes including the extending direction of the tower portion.

12 Claims, 6 Drawing Sheets

OFFSHORE WIND TURBINE GENERATOR

CROSS REFERENCE TO RELATED APPLICATIONS

This application claims the benefit of International Application No. PCT/JP2010/057754, the content of which is incorporated herein by reference.

BACKGROUND OF THE INVENTION

1. Field of the Invention

The present invention relates to an offshore wind turbine generator.

2. Description of Related Art

Offshore wind turbine generators include a monopole type wind turbine that is disposed in a state where the wind turbine floats on a deep ocean as shown in Japanese Translation of PCT International Application, Publication No. 2006-524778.

In this wind turbine, a rotor head on which wind turbine blades are mounted is rotatably mounted on a nacelle. A tower portion that supports the nacelle is not fixed to the sea floor through a base, but the wind turbine is fixed to the sea floor through a mooring cable and floats on a desired sea area.

In such a floating offshore wind turbine generator, since the tower portion is not fixed, the direction of the rotation plane of the wind turbine blades cannot be adjusted in accordance with a wind direction. Therefore, a down-wind type wind turbine that can easily be adjusted in accordance with the wind direction is widely used.

Since it is not possible to adjust the rotation plane in accordance with the wind direction, the nacelle is generally mounted on the tower portion such that it is not rotatable. With this structure, the tower portion autorotates as the orientation of the rotation plane of the wind turbine blades is changed in accordance with the wind direction. Therefore, a portion of the tower portion corresponding to a rotation axis of the wind turbine blade opposite the wind turbine blade is always oriented to the windward.

In the floating offshore wind turbine generator, if the wind turbine blades receive wind, an upper portion of the tower portion attempts to tilt leeward. Thus, great tensile force is applied to the windward side, and great compressive force is applied to the leeward side. Therefore, great stress is generated on the windward side and the leeward side of the tower portion.

According to the patent citation 1, since a structure portion that bears the strength of the tower has a hollow cylindrical structure, the strength thereof is equal in any direction in terms of its cross section. Therefore, a tension leg that applies tension from the outside is disposed on this portion to moderate the unevenly distributed stress.

In case where the tension leg is used, reliability thereof is low because, e.g., the tension leg is stretched so that the stress-moderating effect does not work, or repeated stretching and contraction causes damage on the tension leg due to long-term fatigue. Therefore, the tension leg is frequently replaced by new one. This operation requires, e.g., a large vessel and a large crane, and the operation becomes a large-scale construction.

Since the extra structure, i.e., the tension leg, must be added, production cost is increased, and operation cost is also increased.

The tower portion can be strengthened and the increase in unevenly distributed stress can be suppressed by increasing the diameter of a circle cross section or thickness thereof. In this case, however, the material cost, mechanically machining cost, and transportation cost of the tower portion are increased.

BRIEF SUMMARY OF THE INVENTION

In view of the above problem, it is an object of the present invention to provide a simple and inexpensive offshore wind turbine generator capable of suppressing unevenly distributed stress and of maintaining reliability in terms of strength.

To achieve the above object, the present invention provides the following solutions.

An offshore wind turbine generator according to an aspect of the present invention includes a nacelle that rotatably supports a rotor head, and a column that supports the nacelle and yaws integrally with the nacelle, and a structure portion that bears the strength of the column has a higher strength against a load in a direction included in a plane having a rotation axis of the rotor head and an extending direction of the column than a strength of the structure portion against a load in a direction included in other planes including the extending direction of the column.

If the column receives a wind, the column attempts to tilt leeward. Thus, a great tensile stress is applied to a portion of the column on the side opposite the wind turbine blades at a position corresponding to the rotation axis of the wind turbine blade, i.e., a portion of the column close to the windward, and a great compressive stress is applied to the same side of the column as the wind turbine blade, i.e., a portion of the column close to the leeward. The nacelle that supports the rotor head is mounted such that the nacelle yaws integrally with the column. Therefore, if the wind direction is changed and the wind turbine blades mounted on the rotor head rotate around the axis of the column, the column also rotates around the axis. Thus, a portion of the column located at a position corresponding to the plane including the rotation axis of the rotor head and the extending direction of the column is located along the wind direction at all times.

The structure portion that bears the strength of the column is formed such that the strength of the structure portion against a load in a direction included in a plane including the rotation axis of the rotor head and the extending direction of the column is higher than the strength of the structure portion against a load in a direction included in another plane including the extending direction of the column. Therefore, a great bending stress applied to the column when the wind turbine blades receive a wind is stably supported by the portion of the structure portion having the high strength at all times.

Since the structure portion itself can withstand a great tensile stress and a compressive stress, it is not necessary to add, e.g., a tension leg. Since the tension leg having low reliability in term of strength and requiring large-scale maintenance operation is not used, the production cost and operation cost can be reduced, and the reliability of the offshore wind turbine generator can be enhanced.

The strength against a load in the direction included in another plane including the extending direction of the column can be obtained by, e.g., a thickness, material, cross sectional shape, or welding corresponding to a relatively low stress applied to the plane. Therefore, wastes such as extra material can be avoided, and the cost for the column can be reduced correspondingly.

In other words, according to this aspect, the stress ratio of cross section positions with respect to a permissible stress of a material used for the structure portion, i.e., the local safety ratio, can substantially be equalized.

In this aspect, the structure portion may be a cylinder made of metal, and the length of a cross section intersecting an extending direction of the column at right angle in a direction of a plane including a rotation axis of the rotor head and the extending direction of the column may be longer than the length of another direction of the cross section.

The length in the direction of the plane including the rotation axis of the rotor head and the extending direction of the column is longer than the length of another direction. Therefore, if the plate members have the same materials and thicknesses, a cross section coefficient as viewed in a direction having a longer length is greater than a cross section coefficient as viewed in a direction having a shorter length. Therefore, when the same loads are applied in the longer length direction and the shorter length direction, the longer length direction can withstand a greater stress than that of the shorter length direction.

That is, the structure portion that bears the strength of the column is formed such that the strength of the structure portion in the direction of the plane including the rotation axis of the rotor head and the extending direction of the column is higher than the strength in the direction included in another plane including the extending direction of the column.

In this aspect, the structure portion is a cylinder made of metal, and includes a plurality of divided members divided in a circumferential direction thereof, the strength of the divided member at its portion intersecting, at right angle, a plane including the rotation axis of the rotor head and the extending direction of the column is higher than the strength of the divided member at its portion intersecting other planes including the extending direction of the column at right angle.

The strength of the divided member intersecting, at right angle, the plane including the rotation axis of the rotor head and the extending direction of the column is higher than the strength of the divided member at a location intersecting, at right angle, another plane including the extending direction of the column. Therefore, the structure portion bearing the strength of the column is formed such that the strength thereof in the direction of the plane including the rotation axis of the rotor head and the extending direction of the column is higher than the strength in the direction included in another plane including the extending direction of the column.

According to this configuration, the strengths of the divided members may be changed by using materials having different strengths. In this manner, divided members having the same thicknesses can be used.

According to this configuration, the strengths of the divided members may be changed by changing thicknesses of material.

According to this configuration, the strength of the divided member may be changed by combining a difference in strength and a difference in thickness of the materials.

In this aspect, at least one disk-like or doughnut-like reinforcing member having an outer peripheral portion connected to an inner peripheral portion of the structure portion may be provided in an inner space of the structure portion.

In this manner, the reinforcing member can increase the buckling strength of the structure portion. A plurality of reinforcing members may be provided at distances from one another in the vertical direction.

In the aspect, at least a portion of the structure portion may be made of concrete.

Even if the structure portion is made of concrete, it is possible to change the strength as described above by changing, e.g., the thickness or the density of the reinforcement.

A portion of the structure portion in the vertical direction may be made of concrete, and other portion may be formed into a metal hollow columnar body, and they may be combined with each other.

In this aspect, the structure portion is a truss structure, and a length thereof in a direction of a plane including the rotation axis of the rotor head and the extending direction of the column in a cross section intersecting the extending direction of the column at right angle may be longer than a length thereof in other directions of the cross section.

As described above, the length in the direction of the plane including the rotation axis of the rotor head and the extending direction of the column in the cross section intersecting the extending direction of the column at right angle is longer than the length in another direction of the cross section. Therefore, when the same materials and the same configuration are used, the cross section coefficient of the longer one in this direction is greater than the cross section coefficient of the shorter one.

Therefore, if the same loads are applied, a stress applied in the direction of the plane including the rotation axis of the rotor head and the extending direction of the column is less than a stress applied to other directions of the cross section, and it is possible to withstand a greater stress.

That is, the structure portion of the truss structure bearing the strength of the column is formed such that the strength thereof in the direction of the plane including the rotation axis of the rotor head and the extending direction of the column is higher than the strength in the direction included in the other plane including the extending direction of the column.

In the aspect, an outer surface or an inner surface of the structure portion may include at least one reinforcing member extending on a plane that is in parallel to a plane including the rotation axis of the rotor head and the extending direction of the column.

The outer surface or the inner surface of the structure portion includes at least one reinforcing member extending on a plane that is in parallel to a plane including the rotation axis of the rotor head and the extending direction of the column. Therefore, the structure portion that bears the strength of the column is formed such that the strength thereof in the direction of the plane including the rotation axis of the rotor head and the extending direction of the column is higher than the strength in the direction included in another plane including the extending direction of the column.

According to the present invention, the strength of the structure portion bearing the strength of the column that supports the wind turbine blades and the nacelle in the direction of the plane including the rotation axis of the rotor head and the extending direction of the column is higher than the strength in the direction included in another plane including the extending direction of the column. Therefore, production cost and operation cost can be reduced, and the reliability of the offshore wind turbine generator can be enhanced.

The strength against a load in the direction included in another plane including the extending direction of the column can be obtained by, e.g., a thickness, material, cross sectional shape, or welding corresponding to a relatively small stress applied thereto. Therefore, wastes such as extra material can be cut, and the cost of the column can be reduced correspondingly.

DETAILED DESCRIPTION OF THE INVENTION

An offshore wind turbine generator according to an embodiment of the present invention will be described with reference to the drawings.

Figure 1:
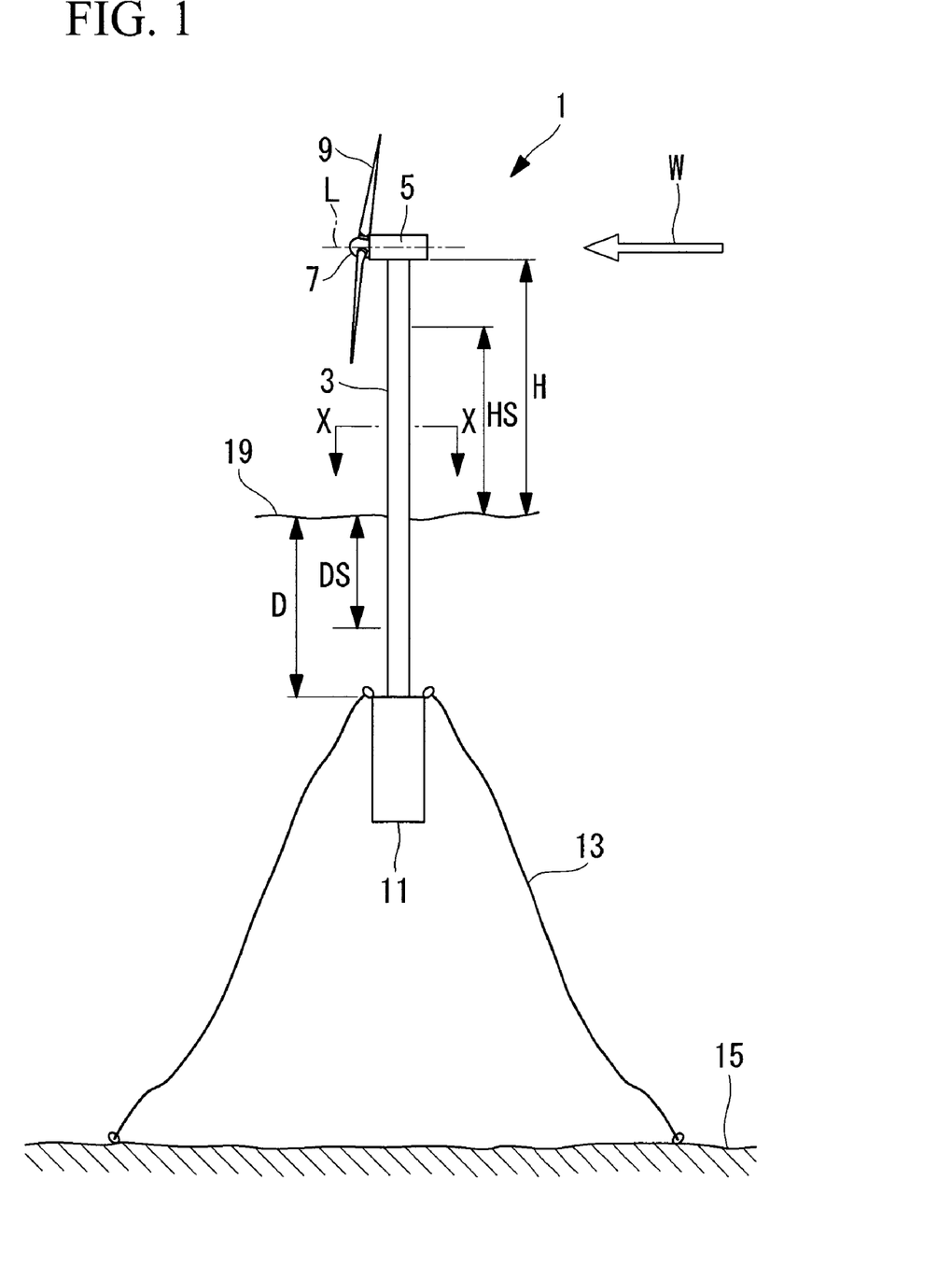
FIG. 1 is a side view showing substantially entire configuration of an offshore wind turbine generator according an embodiment of the present invention.

FIG. 1 is a side view showing substantially the entire configuration of a floating offshore wind turbine generator 1 according the embodiment of the present invention.

The floating offshore wind turbine generator 1 is installed in a state where the wind turbine floats on a relatively deep ocean as compared with an offshore wind turbine generator that is fixed to a sea floor through a base.

The offshore wind turbine generator 1 includes a tower portion (column, structure portion) 3 mounted such that it extends in the vertical direction (extending direction), a nacelle 5 mounted on an upper end of the tower portion 3 integrally with the tower portion 3, a rotor head 7 provided on an end of the nacelle 5 such that the rotor head 7 is rotatable around a substantially horizontal rotation axis L, a plurality of wind turbine blades 9 mounted on the rotor head 7 radially around the rotation axis L, a ballast 11 that is a weight mounted on a lower portion of the column 3, and a plurality of cables 13 for fixing the ballast 11 to a sea floor 15.

If a wind hits on the wind turbine blades 9, a force for rotating the rotor head 7 around the rotation axis L is generated on the wind turbine blades 9, and the rotor head 7 is rotated and driven.

Machines such as a gear box and a generator (both not shown) are contained in the nacelle 5 for generating electricity utilizing the rotation of the rotor head 7.

The ballast 11 is fixed to a sea floor by the cables 13, and the offshore wind turbine generator 1 floats on a desired sea area by, e.g., a buoyant force of the tower portion 3.

The tower portion 3 includes a steel hollow cylinder (metal cylinder) that is a structure portion for bearing the strength. A rectifier cover that adjusts the flow of a wind with respect to the wind turbine blades 9 may be mounted on the tower portion 3 in addition to the structure portion.

Figure 2:
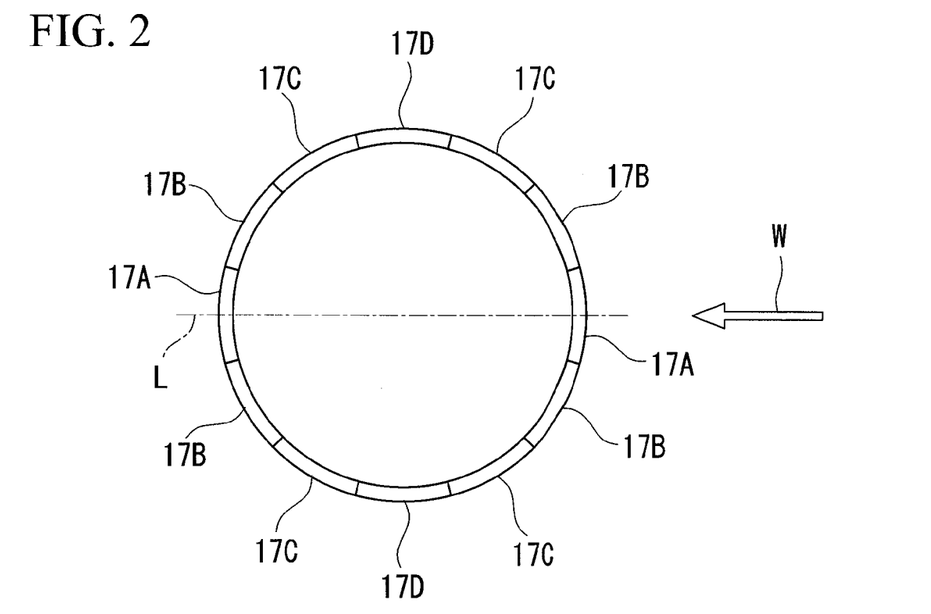
FIG. 2 is a sectional view taken along the line X-X in FIG. 1.

FIG. 2 is a sectional view taken along the line X-X in FIG. 1. As shown in FIG. 2, the tower portion 3 is formed by coupling, to each other by welding, plate members (divided members) 17 divided into a plurality of, e.g., twelve pieces in the circumferential direction. The plate members 17 are made of materials having different strengths, but have the same thicknesses, and the plate members 17 are curved such that they constitute a portion of a circumference individually.

The difference in the strength of the materials of the plate members 17 is defined based on a proof stress, tensile strength, or other mechanical characteristics. Further, welding strength is taken into consideration.

The plurality of plate members 17 are made of a plurality of, e.g., four materials having different strengths. That is, plate members 17A, plate members 17B, plate members 17C, and plate members 17D are formed as the plate members 17, and the strengths of their materials are reduced in this order.

The plate members 17A having the highest strength are disposed at positions through which a plane including a rotation axis L of the rotor head 7, i.e., of the wind turbine blades 9 and the vertical direction (direction perpendicular to the sheet of FIG. 2) that is an extending direction of the tower portion 3 passes. The plate members 17D having the lowest strength are disposed at positions through which a plane that includes a turning center of the tower portion 3 and extends in the vertical direction, and that is substantially perpendicular to the plane including the rotation axis L of the wind turbine blades 9 and the vertical direction that is the extending direction of the tower portion 3 passes. The plate members 17B are adjacent to the plate members 17A, respectively. The plate members 17C are sandwiched between the plate members 17B and the plate members 17D, respectively. In other words, the plate members 17 are disposed such that their strengths become lower from a position corresponding to the rotation axis L in the transverse cross sections thereof toward a position that passes through the turning center of the tower portion 3 and that intersects the rotation axis L at right angle.

The respective strengths of the plate members 17A at the position corresponding to the rotation axis L of the rotor head 7, and the position corresponding to the direction of the plane including the rotation axis L and the vertical direction that is the extending direction of the tower portion 3 are higher than the strengths of the plate members 17B, 17C and 17D that are disposed at the positions of the plane including the turning center of the tower portion 3 and extending in the vertical direction that does not include the rotation axis L. Therefore, the tower portion 3 is formed such that the strength thereof in a direction of the plane including the rotor head 7 and the vertical direction is higher than the strength thereof in a direction included in other planes.

Since a bending stress applied to the tower portion 3 is increased at its central portion heightwise (substantially in the vicinity of the sea level in FIG. 2), the bending stress is not so high at a location close to the nacelle 5. Therefore, a position where the strength is changed in the cross section is limited between the sea level 19 to the height HS. The height HS is set to, for example, 50 to 80% of the height H from the sea level 19 to the nacelle 5. In a region below the sea level also, the cross sections may be changed and combined. In this case, a position where the strength is changed within the cross section is limited from the sea level 19 to a depth DS. The depth DS is set to, for example, 50 to 80% of a depth D from the sea level 19 to the ballast 11.

In this embodiment, the strengths of the plurality of the plate members 17 are changed depending upon strength differences of their materials, but the plate members 17 may be made of material having the same strengths, and the strengths may be changed by difference in thicknesses.

Figure 3:
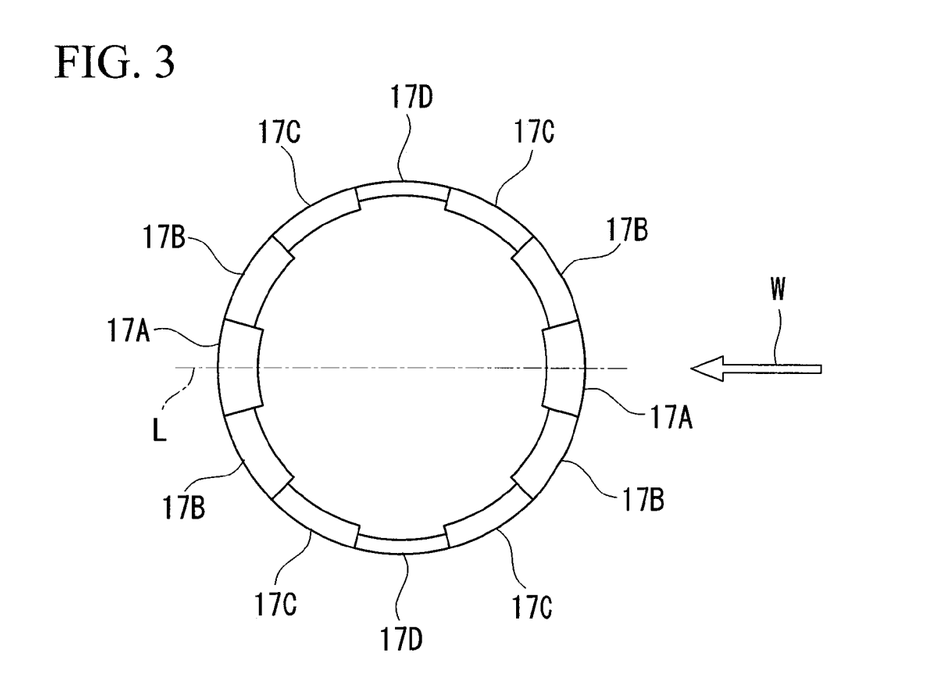
FIG. 3 is a sectional view showing another embodiment of a tower portion according to the embodiment of the present invention, and showing the same portion as that shown in FIG. 2.

That is, if materials having the same strengths are used, the strength is higher if the thickness is increased. Therefore, the thickest plate members 17A are disposed at locations corresponding to the rotation axis L of the rotor head 7 in the transverse cross section of the tower portion 3. The thickness, i.e., strength is reduced from the position corresponding to the rotation axis L toward the position passing through the turning center of the tower portion 3 and intersecting the rotation axis L at right angle, and the thinnest plate members 17D with a lower strength are disposed at the positions substantially intersecting (crossing), at right angle, the rotation axis L in the transverse cross section of the tower portion 3. In this case, a step generated by difference in thickness exists on a side of an inner peripheral surface of the tower portion 3, but the step may exist on a side of an outer peripheral surface of the tower portion 3, or steps may exist on both the sides.

Although the thickness difference is large in FIG. 3 so that the difference can easily be seen, the thickness difference falls within such a range that adjacent plate members 17 can be connected to each other by welding in an actual case.

The strengths of the plurality of plate members 17 may be changed by combining the strength of material forming the plate members 17 and thickness difference with each other.

Next, the outline of an electricity-generating method using the offshore wind turbine generator 1 having the above-described configuration will be described.

The offshore wind turbine generator 1 is floating. Therefore, if the offshore wind turbine generator 1 receives a wind, the tower portion 3 is moved around the turning center such that the wind turbine blades 9 are oriented leeward. That is, the wind turbine blades 9 are located downstream of the wind direction W with respect to the tower portion 3 at all times.

If a wind hits the wind turbine blades 9, a force for moving the wind turbine blades 9 around the rotation axis L is applied to the wind turbine blades 9. Therefore, the rotor head 7 on which the wind turbine blades 9 are mounted rotates around the rotation axis L.

The rotation of the rotor head 7 is accelerated by a gear box disposed in the nacelle 5 and transmitted to the generator, and electricity is generated.

In the case of an offshore wind turbine generator having no gear box, the rotation of the rotor head 7 is transmitted directly to the generator, and electricity is generated.

At that time, if the offshore wind turbine generator receives a wind, the wind turbine blades 9 are moved to the leeward and the tower portion 3 attempts to tilt toward the leeward. Thus, great bending moment is applied to a portion of the tower portion 3 that corresponds to a plane passing through the rotation axis L of the rotor head 7 and extending in the vertical direction and that is opposite from the wind turbine blades 9, i.e., that is on the side of the windward. Therefore, a great stress is generated on that portion of the tower portion 3.

The nacelle 5 that supports the rotor head 7 is mounted on the tower portion 3 such that it does not rotate. Therefore, if the wind direction is changed, the tower portion 3 is moved around its axis such that the wind turbine blades 9 are oriented to the leeward. That is, the tower portion 3 yaws integrally with the nacelle 5.

Thus, a portion of the tower portion 3 that corresponds to a plane including the rotation axis L of the rotor head 7, i.e., the rotating wind turbine blades 9 and the vertical direction always matches with the wind direction W.

In this embodiment, the tower portion 3 is formed such that the strengths of the plate members 17A located at the positions corresponding to the plane including the rotation axis L and the vertical direction are the highest (higher than the strengths of the plate members located at other positions). Therefore, the bending stress caused when the wind turbine blades 9 receive a wind and applied to the tower portion 3 is stably supported by the plate members 17A of the tower portion 3 having the highest strengths.

Since the tower portion 3 itself can withstand a great bending stress, additional equipment such as a tension leg is not required. The tension leg having low reliability in term of strength and requiring large-scale maintenance operation is not used, the production cost and operation cost can be reduced, and the reliability of the offshore wind turbine generator 1 can be enhanced.

The strengths of the plate members 17B, 17C and 17D at the position corresponding to a plane that includes the turning center of the tower portion 3, that extends in the vertical direction, that passes through the turning center of the tower portion 3, and that does not include the rotation axis L of the rotor head 7 can be obtained by thickness corresponding to a relatively small stress applied to the tower portion 3 and materials. Therefore, small (i.e., inexpensive) plate members made of inexpensive material can be used as the plate members 17B, 17C and 17D at these positions.

Therefore, it is possible to cut wastes such as extra material, and the tower portion 3 can be made inexpensively correspondingly.

Each of the plate members 17A, 17B, 17C and 17D is curved such that the plate member constitutes a portion of the circumference, but plate members 17 having trapezoidal cross sections may be combined to form a substantially circular shape without curving the plate members 17A, 17B, 17C and 17D for example. Thus, it is unnecessary to curve the plate members 17, and the production cost can further be reduced.

The cross section shape of the tower portion 3 is circular in this embodiment, i.e., the outside shape has substantially equal length from the axis center of the tower portion 3. Lengths of the traverse cross section shape from the axis center of the tower portion 3 may be different from each other.

Figure 4:
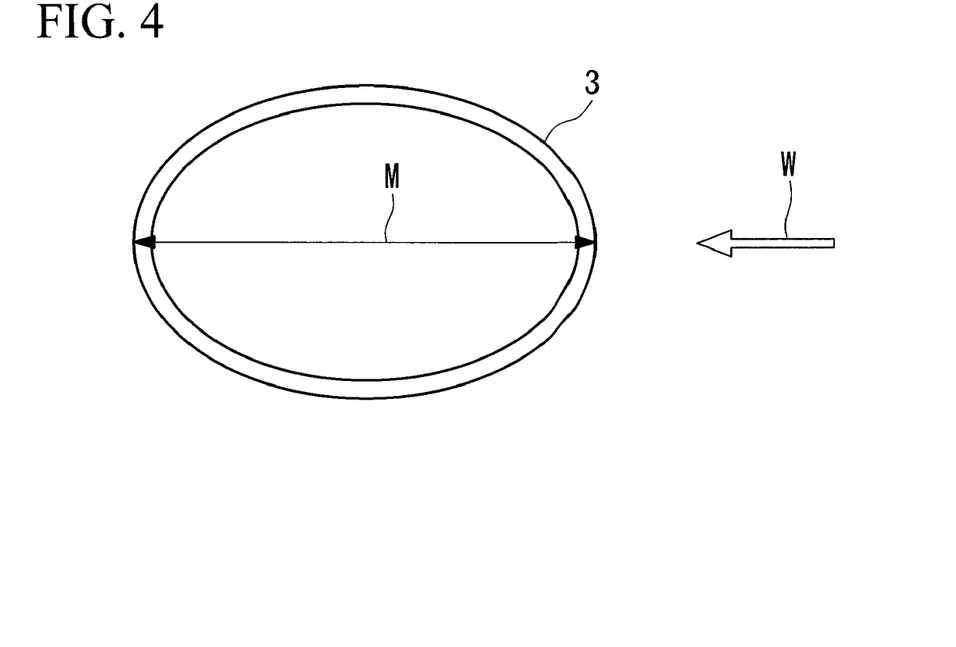
FIG. 4 is a sectional view showing another embodiment of the tower portion according to the embodiment of the present invention, and showing the same portion as that shown in FIG. 2.

The tower portion 3 shown in FIG. 4 is a hollow body made of steel, and has a substantially elliptic cross section. A long side M of the elliptic cross section is located at a position corresponding to the rotation axis L of the rotor head 7, i.e., at a position corresponding to a direction included in a plane having the rotation axis L of the rotor head 7 and the vertical direction. The tower portion 3 is made of material having substantially constant strength and substantially constant thickness.

A length of the long side of the elliptic circle at a position corresponding to the rotation axis L of the rotor head 7 is longer than a length of another position, e.g., a short side passing through the axial center of the tower portion 3 and intersecting the rotation axis L at right angle. Therefore, if the material is the same and the thickness is also the same, a cross section coefficient thereof becomes the greatest.

Therefore, when the same load is applied, a stress applied to a position corresponding to the rotation axis L of the rotor head 7 become smaller than strengths at other positions and thus, it is possible to withstand a greater stress.

That is, the tower portion 3 is formed such that a strength thereof at a position corresponding to a direction included in a plane including the rotation axis L of the rotor head 7 and the vertical direction becomes higher than strengths thereof at other positions.

The tower portion 3 is formed such that the strength thereof at the position corresponding to the direction included in the plane including the rotation axis L of the rotor head 7 and the vertical direction is the highest. Therefore, a great bending stress applied to the tower portion 3 when the wind turbine blades 9 receive a wind is always stably supported by the portion of the tower portion 3 having the high strength.

Since the tower portion 3 itself can withstand a great bending stress, additional equipment such as a tension leg is not required. The tension leg having low reliability in term of strength and requiring large-scale maintenance operation is not used, the production cost and operation cost can be reduced, and the reliability of the offshore wind turbine generator 1 can be enhanced.

The strength of the tower portion 3 at a position corresponding to a position corresponding to the direction included in the plane including the rotation axis L of the rotor head 7 and the vertical direction is enhanced by the cross section shape. Therefore, a material having high strength or thick material are unnecessary for enhancing the strength of that portion.

The cross section shape of the tower portion 3 is not limited to the elliptic shape. For example, the shape may be a rectangular shape, and its long side may extend along the axis L of the rotor head 7. A position corresponding to the rotation axis L of the rotor head 7 may have a long polygonal shape.

To obtain optimal strength distribution, a substantially elliptic load-optimizing cross section for equalizing a safe rate may be employed while taking a fatigue load, a buckling load and a maximum load of the plate members 17A to 17D, or at further finely divided position of the cross section of the tow body.

The cross section shape as shown in FIG. 4 is employed, the plate members 17 shown in FIGS. 2 and 3 are used, and one of the strength or thickness may be changed.

Figure 5:
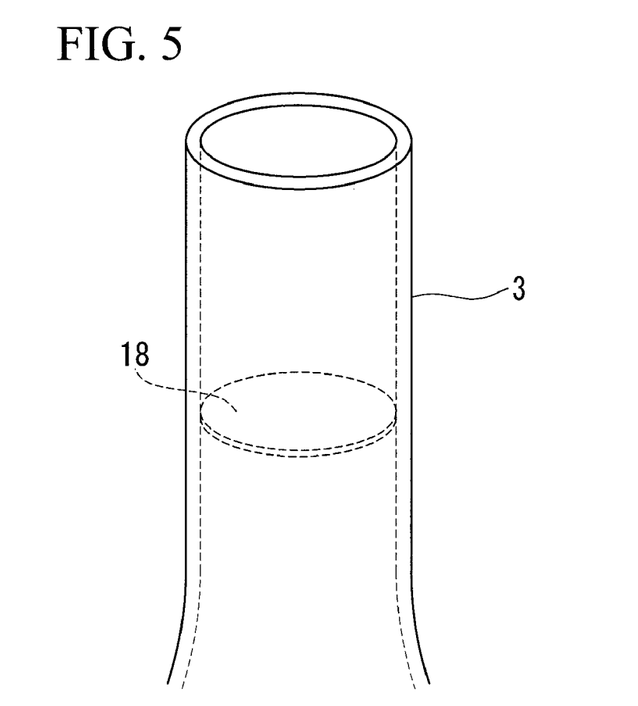
FIG. 5 is a partial perspective view showing another embodiment of the tower portion according to the embodiment of the present invention.

Although the tower portion 3 as the structure portion is hollow in this embodiment, the present invention is not limited to this. For example, a disk-like reinforcing member 18 may be provided in an inner space of the tower portion 3 as shown in FIG. 5.

A plurality of reinforcing members 18 may be provided at a distance from one another in the vertical direction.

With this the reinforcing members 18 can increase the buckling strength of the tower portion 3.

Figure 6:
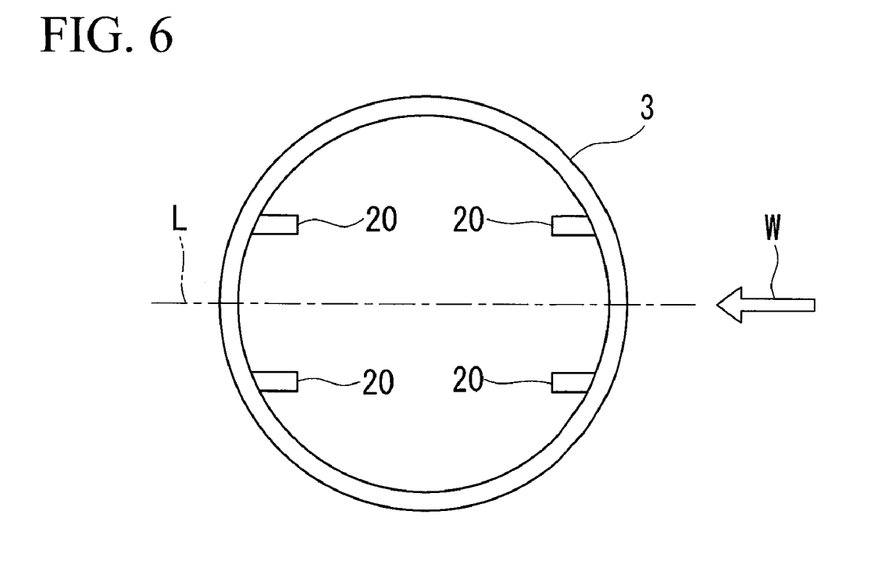
FIG. 6 is a sectional view showing another embodiment of the tower portion according to the embodiment of the present invention, and showing the same portion as that shown in FIG. 2.

As shown in FIG. 6, reinforcing members 20 extending on a plane that is in parallel to a plane including the rotation axis L of the rotor head 7 and the vertical direction may be provided in the inner space of the tower portion 3.

In FIG. 6, two reinforcing members 20 having substantially equal distances are provided astride the rotation axis L. The number of the reinforcing members 20 is not limited to two, and one or three or more reinforcing members 20 may be employed. It is preferable that the reinforcing members 20 are symmetric about the rotation axis L with respect to a line, but the present invention is not limited to the positions symmetric about the rotation axis L with respect to the line.

Thus, the tower portion 3 is formed such that the strength thereof in the direction of the plane including the rotation axis L of the rotor head 7 and the vertical direction becomes higher than the strength thereof in the direction included in the other plane including the vertical direction.

Figure 7:
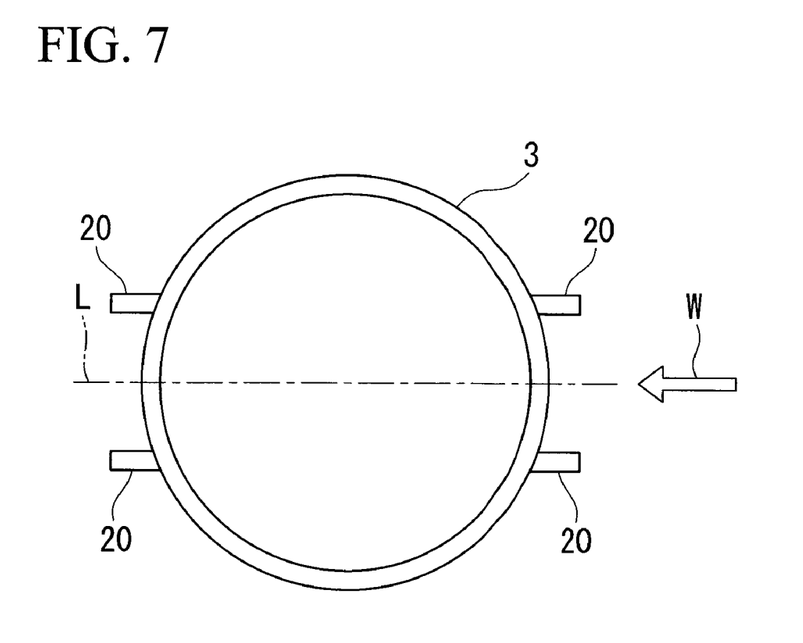
FIG. 7 is a sectional view showing another embodiment of the tower portion according to the embodiment of the present invention, and showing the same portion as that shown in FIG. 2.

As shown in FIG. 7, the reinforcing members 20 may be mounted on an outer surface of the tower portion 3.

Figure 8:
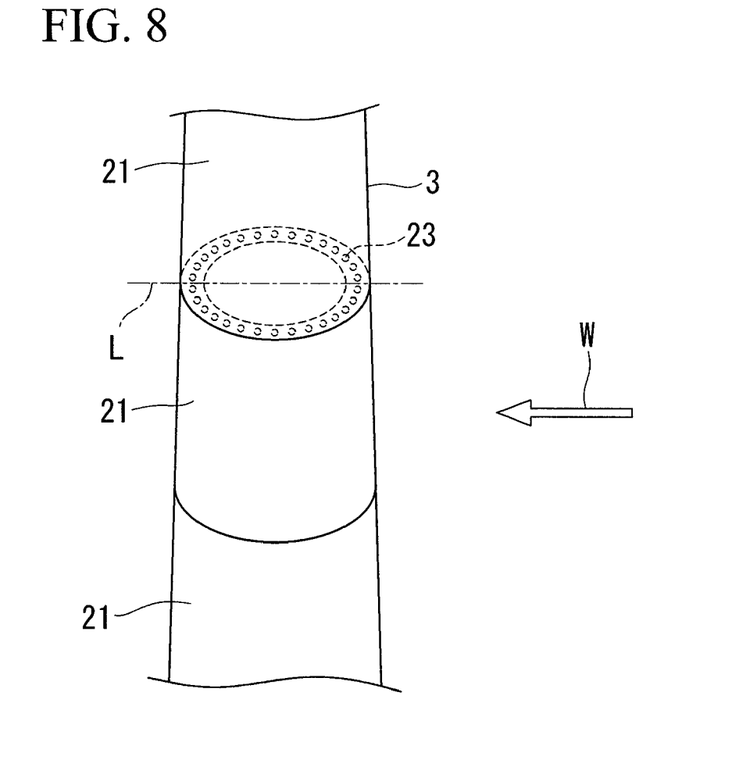
FIG. 8 is a partial side view showing another embodiment of the tower portion according to the embodiment of the present invention.

Although the tower portion 3 is made of steel in this embodiment, the tower portion 3 may be made of concrete as shown in FIG. 8.

The tower portion 3 is integrally formed by superposing a plurality of concrete cylindrical segments 21 in the vertical direction. At that time, to enhance the endurance against an external force, post-tension type prestress is introduced and integrally formed.

The segments 21 are formed such that the thickness is sequentially reduced from a position corresponding to a direction included in a plane having the rotation axis L of the rotor head 7 and the vertical direction toward a position intersecting the former position at right angle. Reinforcements 23 are disposes at substantially equal density. Thus, the strength of the concrete in the circumferential direction becomes the highest at a position corresponding to the direction included in the plane including the rotation axis L of the rotor head 7 and the vertical direction as in the case shown in FIG. 2, and the strength is gradually lowered toward a position intersecting with the former position at right angle.

The strength of the tower portion 3 is the highest (higher than strengths at other positions) at the position corresponding to the direction included in the plane including the rotation axis L of the rotor head 7 and the vertical direction. Therefore, a great bending stress applied to the tower portion 3 when the wind turbine blades 9 receive a wind is always stably supported by the portion of the of the tower portion 3 having the highest strength.

Since the tower portion 3 itself withstands the great bending stress, additional equipment such as a tension leg is not required. The tension leg having low reliability in term of strength and requiring large-scale maintenance operation is not used, the production cost and operation cost can be reduced, and the reliability of the offshore wind turbine generator 1 can be enhanced.

Although the thickness of the concrete is changed to change the strength in the circumferential direction here, the strength may be changed by changing the density of the reinforcement 23 that reinforces the concrete or by changing material thereof.

Figure 9:
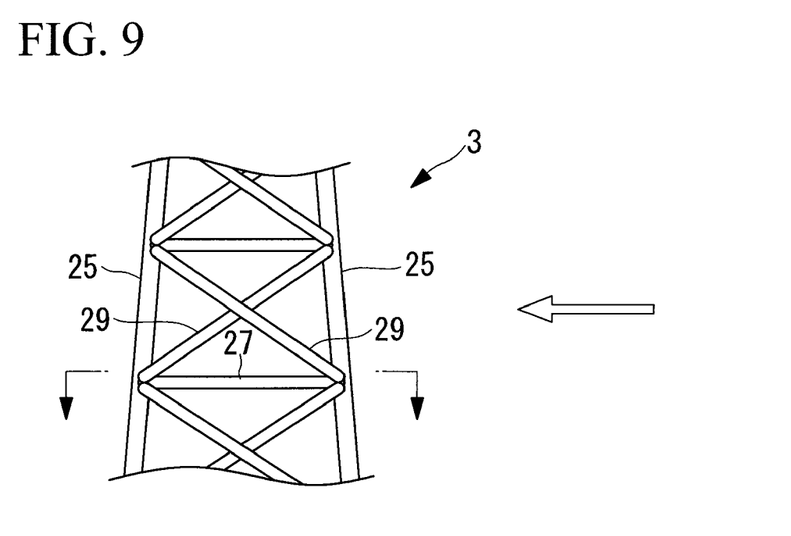
FIG. 9 is a partial side view showing another embodiment of the tower portion according to the embodiment of the present invention.
Figure 10:
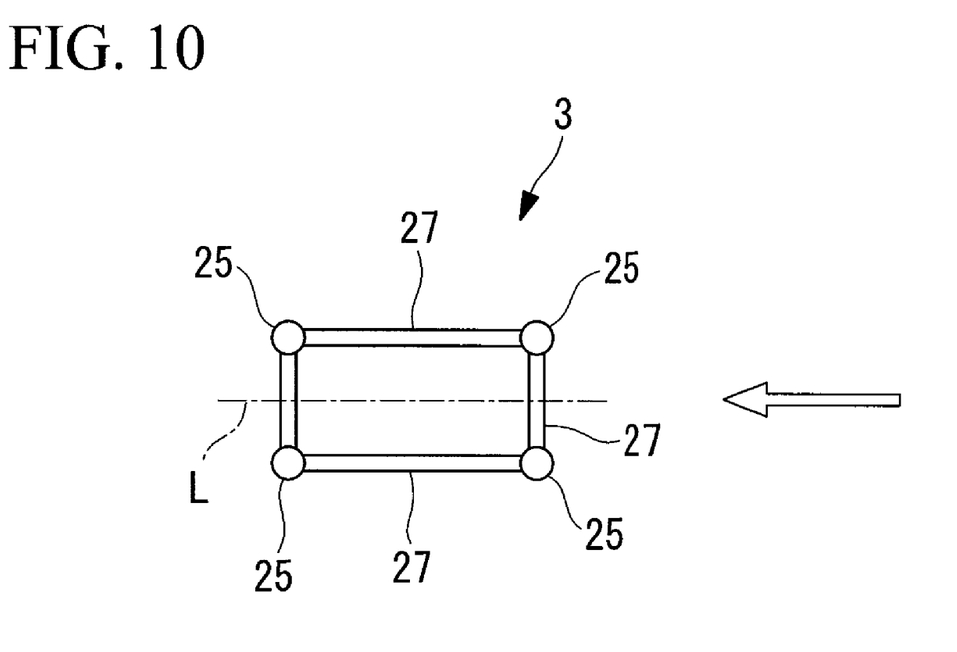
FIG. 10 is a sectional view taken along the line Y-Y in FIG. 9.

Although the tower portion 3 is columnar in shape in this embodiment, the tower portion 3 may be of a truss structure as shown in FIGS. 9 and 10.

As shown in FIG. 9 for example, the truss structure includes column materials 25 extending in the vertical direction at four corners, horizontal materials 27 that are set to extend substantially horizontally for reinforcing between the column materials 25 at a distance from each other in the vertical direction, and brace materials 29 for diagonally reinforcing between the column materials 25. The column materials 25, the horizontal material 27 and the brace materials 29 are formed from steel pipes or die steel, and they are opposed to a tensile force and a compressive force.

The column materials 25 are divided into a plurality of pieces in the vertical direction and they are connected to each other through joints (not shown). The horizontal materials 27 and the brace materials 29 are connected to the column materials 25 through connecting brackets.

The tower portion 3 may be formed in the following manner. That is, blocks each formed by mounting the horizontal materials 27 and the brace materials 29 in a unit of a predetermined length of the column material 25 are formed in a factory, they are conveyed to a construction site, and they are piled up to form the tower portion 3.

As shown in FIG. 10, according to this truss structure, as viewed from above, a length of a position corresponding to the direction included in the plane including the rotation axis L of the rotor head 7 and the vertical direction, in other words, a length of a position corresponding to the rotation axis L of the rotor head 7, is longer than a length of a position corresponding to a direction intersecting the former length at right angle.

Although a shape as viewed from above is a rectangular shape as shown in FIG. 10, the shape as viewed from above is not limited to this. Any polygonal shape in which a length at a position corresponding to the rotation axis L is the longest may be employed.

According to the truss structure forming the tower portion 3, the length of the position corresponding to the rotation axis L of the rotor head 7 is longer than the length of the position corresponding to the direction intersecting the former length at right angle. Therefore, if the materials are the same, a cross section coefficient of a longer member is greater than that of a shorter member.

Therefore, when the same load is applied, a stress applied to a position corresponding to the rotation axis L of the rotor head 7 is smaller than a stress at a position corresponding to a direction intersecting the former stress at right angle and therefore, it is possible to withstand a greater stress.

That is, the tower portion 3 is formed such that a strength thereof at the position corresponding to the direction included in the plane including the rotation axis L of the rotor head 7 and the vertical direction is higher than a strength at a position corresponding to the direction intersecting with the former direction at right angle.

The tower portion 3 is formed such that the strength thereof at the position corresponding to the direction included in the plane including the rotation axis L of the rotor head 7 and the vertical direction is the highest. Therefore, a great bending stress applied to the tower portion 3 when the wind turbine blades 9 receive a wind is always stably supported by the portion of the of the tower portion 3 having the highest strength.

Since the tower portion 3 itself withstands the great bending stress, additional equipment such as a tension leg is not required. The tension leg having low reliability in term of strength and requiring large-scale maintenance operation is not used, the production cost and operation cost can be reduced, and the reliability of the offshore wind turbine generator 1 can be enhanced.

The present invention is not limited to the embodiment, and the invention can appropriately be modified within a range not departing from the subject matter of the invention.

What is claimed is:

1. A floating offshore wind turbine generator comprising:
a nacelle that rotatably supports a rotor head;
a column that supports the nacelle and yaws integrally with the nacelle;
a ballast that is mounted to a lower portion of the column; and
a cable that is configured to connect the ballast to a sea floor, wherein
the column has a structure portion that bears a strength of the column and that has a higher strength against a load in a direction included in a plane having a rotation axis of the rotor head and an extending direction of the column than a strength of the structure portion against a load in a direction included in other planes including the extending direction of the column, and
the structure portion extends from a position of 50 to 80% of a height from a sea level to the nacelle to a position of 50 to 80% of a depth from the sea level to the ballast.

2. The floating offshore wind turbine generator according to claim 1, wherein
the structure portion is a cylinder made of metal, and
a length of a cross section intersecting, at right angle, the extending direction of the column in a direction of a plane including a rotation axis of the rotor head and the extending direction of the column is longer than a length of another direction of the cross section.

3. The floating offshore wind turbine generator according to claim 2, further comprising at least one disk-shaped or doughnut-shaped reinforcing member that has an outer peripheral portion connected to an inner peripheral portion of the structure portion and is provided in an inner space of the structure portion.

4. The floating offshore wind turbine generator according to claim 1, wherein the structure portion is a cylinder made of metal, and includes a plurality of divided members divided in a circumferential direction of the structure portion,
a strength of the divided member intersecting, at right angle, a plane including the rotation axis of the rotor head and the extending direction of the column is higher than a strength of the divided member intersecting other planes including the extending direction of the column at right angle.

5. The floating offshore wind turbine generator according to claim 4, wherein the strengths of the divided members are changeable by using materials of the divided member having different strengths.

6. The floating offshore wind turbine generator according to claim 4, wherein the strength of the divided member is changeable by changing a thickness of material of the divided member.

7. The floating offshore wind turbine generator according to claim 4, further comprising at least one disk-shaped or doughnut-shaped reinforcing member that has an outer peripheral portion connected to an inner peripheral portion of the structure portion and is provided in an inner space of the structure portion.

8. The floating offshore wind turbine generator according to claim 1, wherein at least a portion of the structure portion is made of concrete.

9. The floating offshore wind turbine generator according to claim 1, wherein
the structure portion has a truss structure, and
the length of the structure portion in a direction of a plane including the rotation axis of the rotor head and the extending direction of the column in a cross section intersecting the extending direction of the column at right angle is longer than the length thereof in another direction of the cross section.

10. The floating offshore wind turbine generator according to claim 1, wherein an outer surface or an inner surface of the structure portion includes at least one reinforcing member extending on a plane that is in parallel to a plane including the rotation axis of the rotor head and the extending direction of the column.

11. The floating offshore wind turbine generator according to claim 1, wherein
the structure portion includes a plurality of divided members divided in a circumferential direction of the structure portion,
the plurality of divided members have a first member, a second member and a third member connected together, the second member being arranged between the first member and the third member, and
a thickness of the second member is greater than that of the first member and less than that of the third member.

12. A floating offshore wind turbine generator comprising:
a nacelle that rotatably supports a rotor head;
a column that supports the nacelle and yaws integrally with the nacelle;
a ballast that is mounted to a lower portion of the column; and a cable that is configured to connect the ballast to a sea floor, wherein the column has a structure portion that bears a strength of the column and that has a higher strength against a load in a direction included in a plane having a rotation axis of the rotor head and an extending direction of the column than a strength of the structure portion against a load in a direction included in other planes including the extending direction of the column, the structure portion is a cylinder made of metal, and includes a plurality of divided members divided in a circumferential direction of the structure portion, a strength of the divided member intersecting, at right angle, a plane including the rotation axis of the rotor head and the extending direction of the column is higher than a strength of the divided member intersecting other planes including the extending direction of the column at right angle, and the floating offshore wind turbine generator further includes at least one disk-shaped or doughnut-shaped reinforcing member that has an outer peripheral portion connected to an inner peripheral portion of the structure portion and is provided in an inner space of the structure portion.

* * * * *